United States Patent
Ranganathan et al.

(10) Patent No.: US 10,534,518 B2
(45) Date of Patent: Jan. 14, 2020

(54) GRAPHICAL MODEL EXPLORER

(71) Applicant: Honeywell International Inc., Morristown, NJ (US)

(72) Inventors: Vijayakumar Ranganathan, Karnataka (IN); Rajapriyan Thambidurai, Karnataka (IN); Timothy Black, Edmonton (CA)

(73) Assignee: Honeywell International Inc., Morris Plains, NJ (US)

( * ) Notice: Subject to any disclaimer, the term of this patent is extended or adjusted under 35 U.S.C. 154(b) by 540 days.

(21) Appl. No.: 14/791,676

(22) Filed: Jul. 6, 2015

(65) Prior Publication Data

US 2017/0010787 A1    Jan. 12, 2017

(51) Int. Cl.
*G06F 3/0484* (2013.01)
*G06F 3/0482* (2013.01)
*G06Q 10/06* (2012.01)

(52) U.S. Cl.
CPC ........ *G06F 3/04842* (2013.01); *G06F 3/0482* (2013.01); *G06Q 10/067* (2013.01)

(58) Field of Classification Search
CPC .......................... G06F 3/04842; G06Q 10/067
See application file for complete search history.

(56) References Cited

U.S. PATENT DOCUMENTS

| | | | |
|---|---|---|---|
| 6,931,604 B2 | 8/2005 | Lane | |
| 8,291,334 B1* | 10/2012 | Castellanos | G06F 3/048 715/769 |
| 8,332,782 B1* | 12/2012 | Chang | H04L 12/6418 707/794 |
| 2006/0106847 A1* | 5/2006 | Eckardt, III | G06F 17/30696 |
| 2009/0030556 A1* | 1/2009 | Castelli | G06Q 10/063 700/286 |
| 2009/0281845 A1* | 11/2009 | Fukuda | G06Q 10/06393 705/7.39 |
| 2010/0309206 A1* | 12/2010 | Xie | G06N 99/005 345/440 |
| 2011/0125746 A1* | 5/2011 | Leary | B64D 45/0015 707/737 |

(Continued)

OTHER PUBLICATIONS

Barnes, et al., A hierarchical O(N log N) force-calculation algorithm), Nature vol. 324, pp. 446-449, published on Dec. 4, 1986.*

*Primary Examiner* — Eric J. Bycer (57) ABSTRACT

A method of on-demand model navigation includes providing a graphical explorer layout (GEL) algorithm for user exploring within an enterprise process model including assets as nodes, relationships between assets as links between nodes, and related node information. The GEL triggers on the display device displaying an initial dashboard fixed view including ≥2 of the nodes (shown nodes), a context menu and a menu for the links. Responsive to selecting a first of the shown nodes (first selected node) from the dashboard fixed view, displaying a first on-demand enterprise model graph showing the first selected node as an anchor node along with related nodes with links therebetween shown. Responsive to selecting a second of the shown nodes, a second on-demand enterprise model graph having ≥two levels can be displayed with the second selected node as an anchor node along with related nodes with the links therebetween shown.

16 Claims, 8 Drawing Sheets

(56) References Cited

U.S. PATENT DOCUMENTS

2011/0234595 A1* 9/2011 Poston .................... G06T 11/20
345/440
2014/0297569 A1* 10/2014 Clark ..................... G06Q 10/00
706/11

* cited by examiner

PRIOR ART

GRAPHICAL MODEL EXPLORER

FIELD

Disclosed embodiments relate to model navigation.

BACKGROUND

Traditional model navigation with hierarchical navigation structures is challenged when the model (e.g., an enterprise process model) is huge including complex interrelationships between the model nodes. Visualizing such relationships in traditional model navigation is difficult and as a consequence the user can lose the context. Losing the context refers to confusion as to the root node and where the current navigation node is positioned with respect to the root node in a large and complex model such as an enterprise model. For example in the oil drilling context, if the user is navigating to a particular well, well01, in a loss of context there is uncertainty whether well01 belongs to producing wells and where its location is under the enterprise structure.

For problem resolution in enterprise scenarios, such as in industrial processes, the model users are technical individual(s) such as but not limited to plant managers and reliability engineers, who often need to analyze a particular Key Performance Indicator (KPI) for solving problems that need quick access to related information, such as the well production yield KPI indicating that it moves away from the yield target of X %. A production manager may analyze to try understanding the related causes and how it impacts the overall site level performance. All the related information around the well such as well type, location, maintenance history, well engineer role associated, well downhole pressure, down hole temperature, etc., may be relevant to the problem.

This is challenging when using existing visual representations where the application has hierarchical "model tree"-based navigation for exploring a semantic model to visualize an entity in the model. A semantic model is a conceptual enterprise data model which includes the capability to express information that enables parties to the information exchange to interpret meaning (semantics) from the instances, without the need to know the meta-model. The types and instances of a semantic model are called nodes. Another solution for providing access to the related information relating to a process problem is to pre-build such relationships through dashboard(s) which provides a fixed view.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize problem resolution in enterprise model structures (such as model graph 350 shown in FIG. 3 described below) based on traditional model navigation (e.g., hierarchical tree-based navigations or dashboards) each have significant problems that limit their effectiveness. Disclosed embodiments instead dynamically build the plurality of assets and relationships between the plurality of assets in a graphical enterprise model as nodes and links (connections) between the nodes to provide an on-demand visual enterprise model graph, anchored on a particular user selected node (anchor node) in the enterprise model. A disclosed graphical explorer layout (GEL) algorithm is used for the dynamic positioning of the nodes and links, such as based on a Barnes-Hut algorithm. The GEL algorithm can be used along with one or more optional enhancements as described herein which can be particularly beneficial for Manufacturing Enterprise System (MES) applications.

Enhancements to the Barnes-Hut algorithm or related dynamic position of nodes and links algorithms include clustering of similar nodes which can be used if the number of the nodes is more than a configurable (predetermined) limit. This can be helpful in case of MES applications where there may be more "children" nodes associated with a single "parent" node. The plurality of nodes may be grouped into clustered and non-clustered nodes and then visually differentiated from one another in the enterprise model graph. Other optional algorithm additions include adding the ability to obtain more related information including node attributes such as well location, well type, and process parameters such as down hole pressure of the well regarding the individual nodes, and the ability to fix the position of selected asset types so that the user can understand the origin to the point of the node under focus.

It is noted one having ordinary skill in the art it would not be able using pen and paper by human mechanical or intellectual effort (even with significant time and much pain or effort) to perform disclosed methods because manually drawing the information of enterprise model scale is both time consuming and error prone. The disclosed GEL algorithm helps in visualizing this information automatically from the underlying model. Moreover, it is difficult if not impossible to maintain if there are any changes to the underling information in the enterprise model and/or in updating essentially real-time process parameter data associated with some of the nodes.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include graphical model explorers which provide a user' experience for enterprise collaboration business applications such as intuition executive applications which solve the use case of "on-demand" analysis when used along with dashboards and a browser having tags to visually understand the relationships of the assets in an enterprise model in a graphical way. Disclosed graphical model explorers present the network of relationships from a starting node to the desired node when explored from an enterprise process model such as a semantic process model. Such graphical model explorers show the associations of each node in the model (a node's relationships) while being graphically explored and allows navigating to other pages to explore further relationships (links) as well as passing the context.

Disclosed graphical model explorers solve the problem of presenting a large enterprise process model in context (as represented in dashboard 410 shown in FIG. 4A described below) in an easy to understand graphical model visualization for users. For example see the semantic model graph 200 in FIG. 2A and in FIG. 4B, and the semantic model graph 250 in FIG. 2B all described below.

Figure 1:
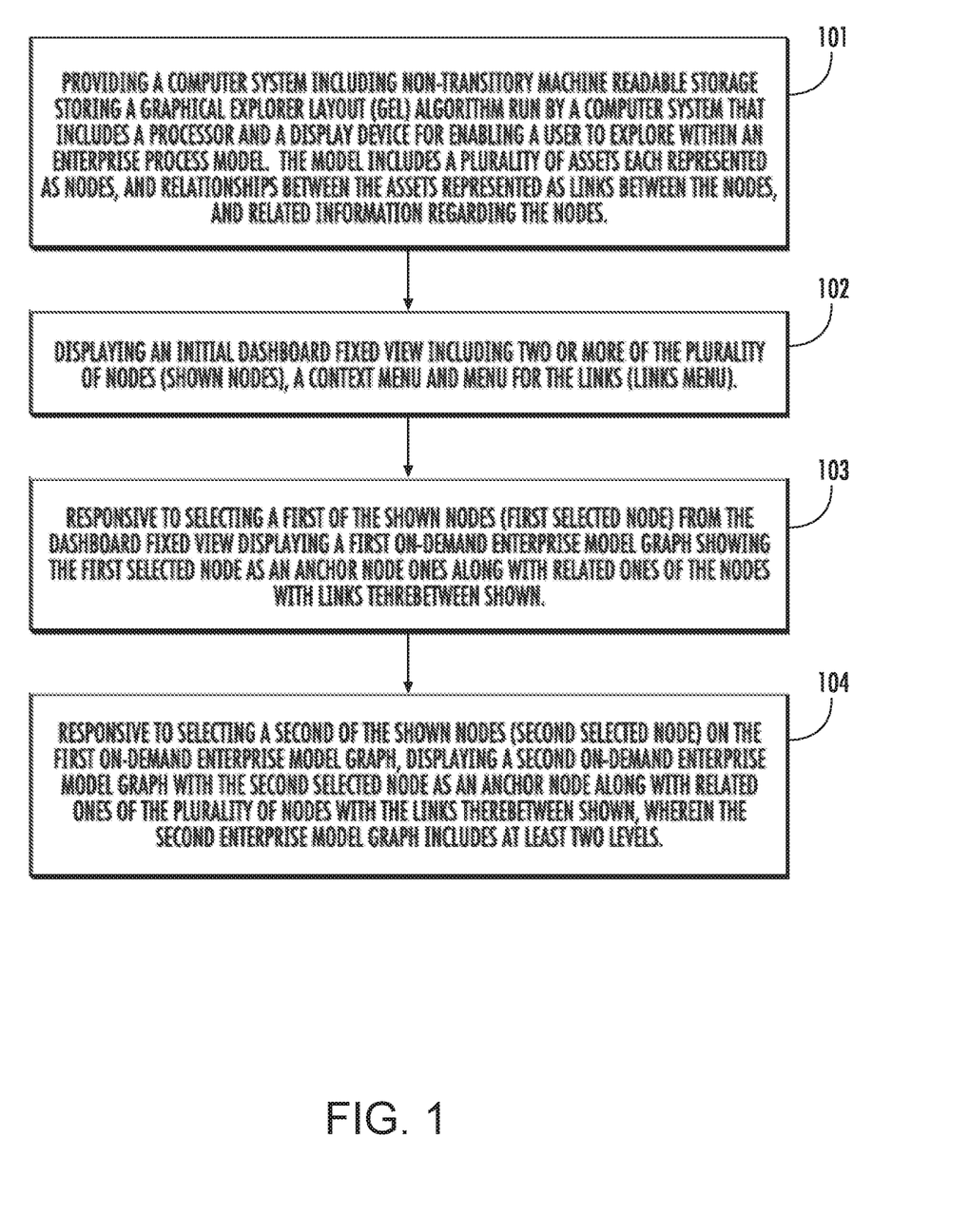
FIG. 1 is a flow chart that shows steps in an example method of on-demand model navigation using enterprise model graph, according to an example embodiment.

Disclosed embodiments in FIG. 1 include a method 100 of on-demand model navigation using a graphical model. Step 101 comprises providing a computer system including non-transitory machine readable storage storing a GEL algorithm run by a computer system that includes a processor and a display device for enabling a user to explore within an enterprise process model. The user generally starts from a fixed dashboard view (see example dashboard view 410 in FIG. 4A described below).

The process model includes a plurality of assets each represented as nodes to provide a plurality of nodes, and relationships between the assets represented as links between the plurality of nodes, and related information regarding the nodes comprising attributes such as operating boundaries and asset type, and process parameters associated with the nodes including performance and monitoring attributes such as but not limited to KPI. For the well node example download pressure can be a process parameter and the well type can be an attribute. "Assets" as used herein includes equipment (such as refineries and farms and tanks in the oil context) as well as the people's (e.g., engineer's) roles, and logical assets such as site, plant, business, products and feeds. "Relationships" as used herein refers to relationships in a semantic sense so that an asset is related to a person in charge of it, location, interlinked with other assets, products and raw materials. As people's (e.g., engineer's) roles including the person in charge of a given asset (anchor node) is also included in disclosed navigational scenarios. The GEL triggers various displays on the display device in steps 102 to 105 described below.

Step 102 comprises displaying an initial dashboard fixed view including a context menu with a selectable context (context relation to nodes), a menu for the links (links menu) and two or more of the plurality of nodes (shown nodes) as selectable nodes to navigate. See the example dashboard view 410 shown in FIG. 4A described below. What is initially shown on the initial dashboard view is typically based on the customer' needs, which generally varies between customers.

Step 103 comprises responsive to the user selecting (e.g., clicking on a mouse pointer or touching a touch sensitive screen) one of the shown nodes (first selected node) from the dashboard fixed view displaying a first on-demand enterprise model graph (first enterprise model graph) showing the first selected node as the anchor node along with related ones of the plurality of nodes with links there between shown.

Figure 2A:
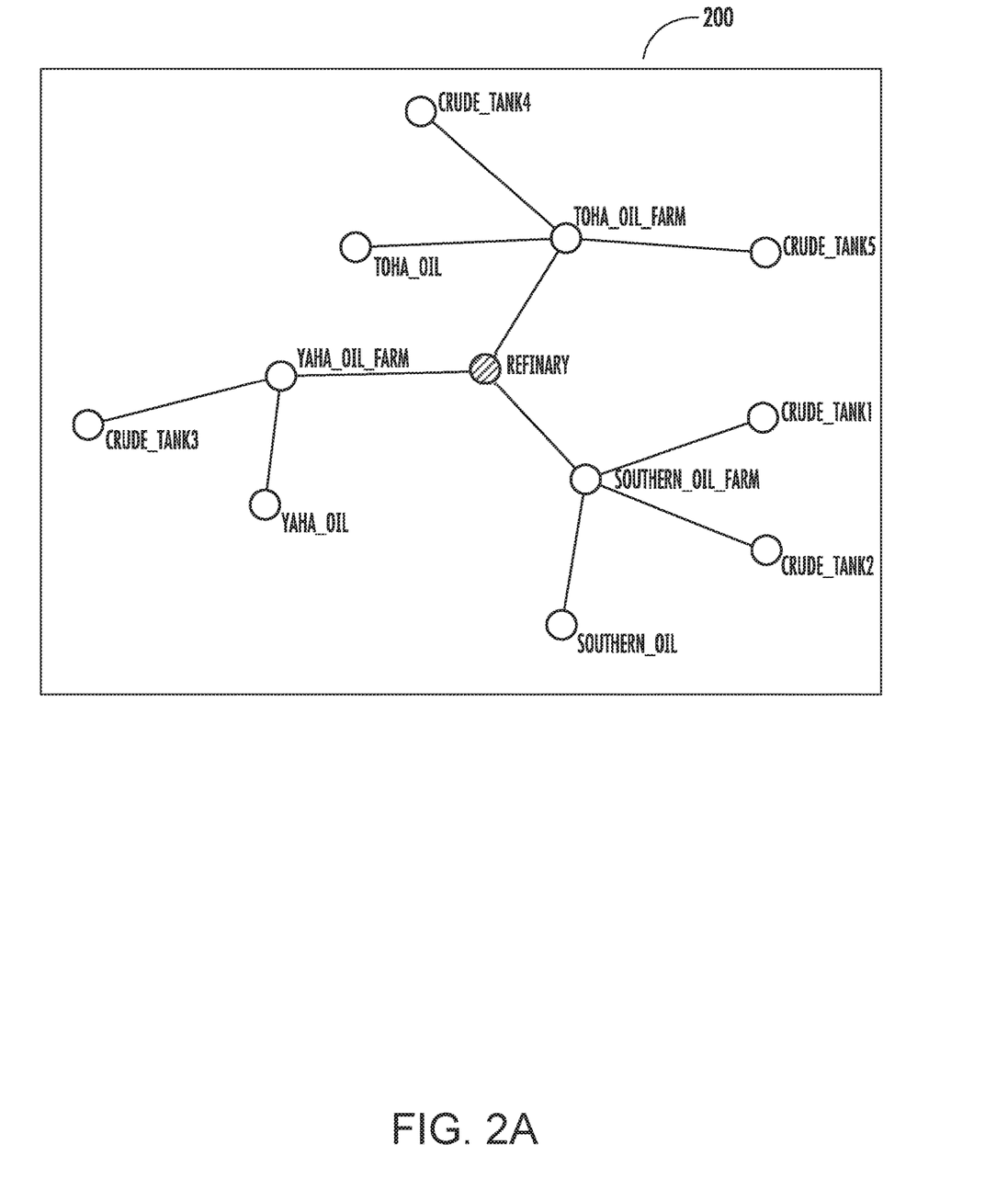
FIG. 2A shows an example GEL output comprising an on-demand semantic model graph with the anchor node selected being a refinery having a plurality of associated nodes including the Southern_Oil_Farm node.

FIG. 2A shows an example GEL output comprising a first semantic model graph 200 with the refinery being the selected node and thus the anchor node along with other nodes including oil-farms including the Southern_Oil_Farm node and the tanks that feed crude oil to each oil-farm. First semantic model graph may be considered a first drill down. First semantic model graph 200 shows the various nodes linked to the refinery node as the anchor node, and how the various nodes are linked (direct or indirect connections).

In step 104, responsive to the user selecting a second of the shown nodes (second selected node) from the first enterprise model graph, displaying a second on-demand enterprise model graph with the second selected node as an anchor node along with related ones of the plurality of nodes with the links there between shown, wherein the second on-demand enterprise model graph includes at least two levels. As used herein "level" refers to the graph's depth in terms of the relationship of the anchor node with other nodes.

Figure 2B:
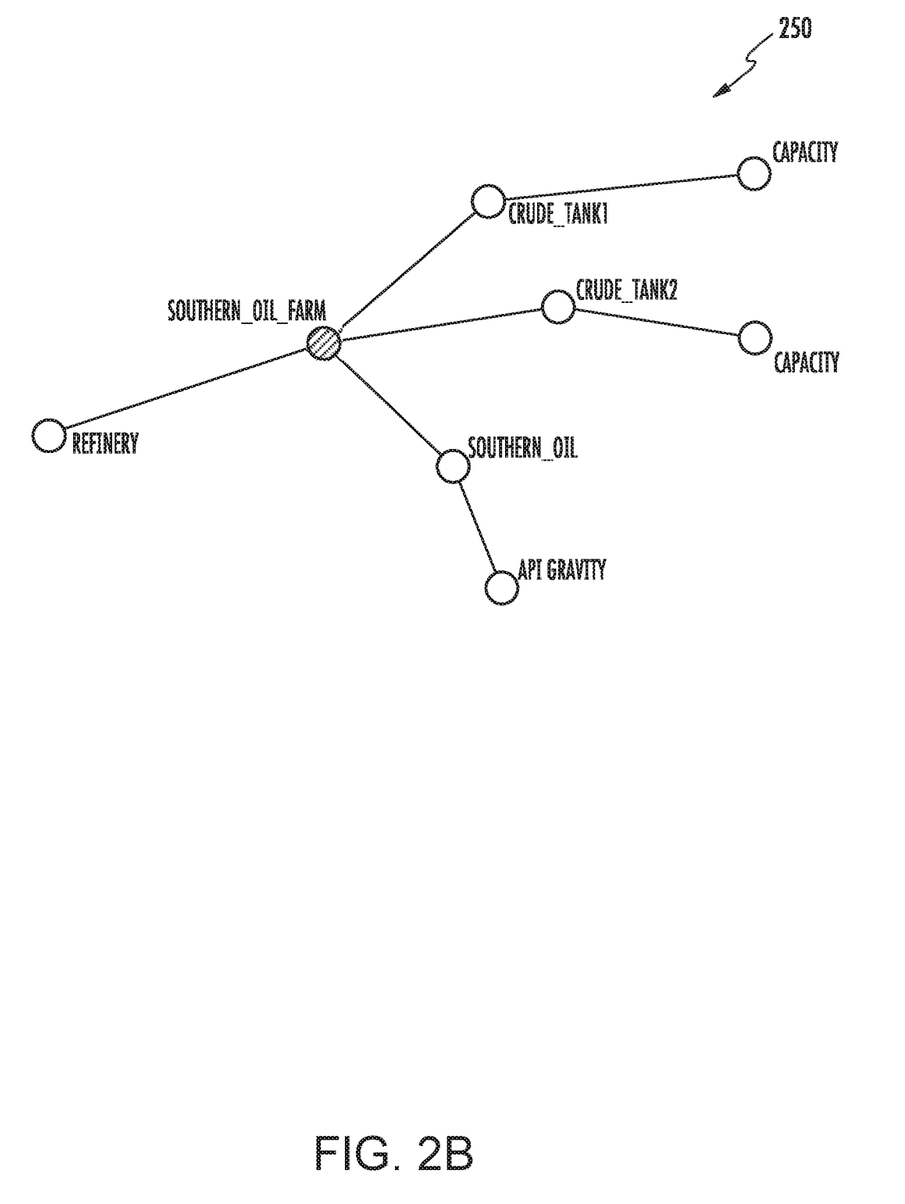
FIG. 2B shows an example GEL output comprising an on-demand semantic model graph with the anchor node now being the Southern_Oil_Farm node.

The second enterprise model graph may be considered a second drill down. FIG. 2B shows an example GEL output comprising a second semantic model graph 250 with the anchor node now being the Southern_Oil_Farm node which shows nodes related to it the links there between.

Figure 3:
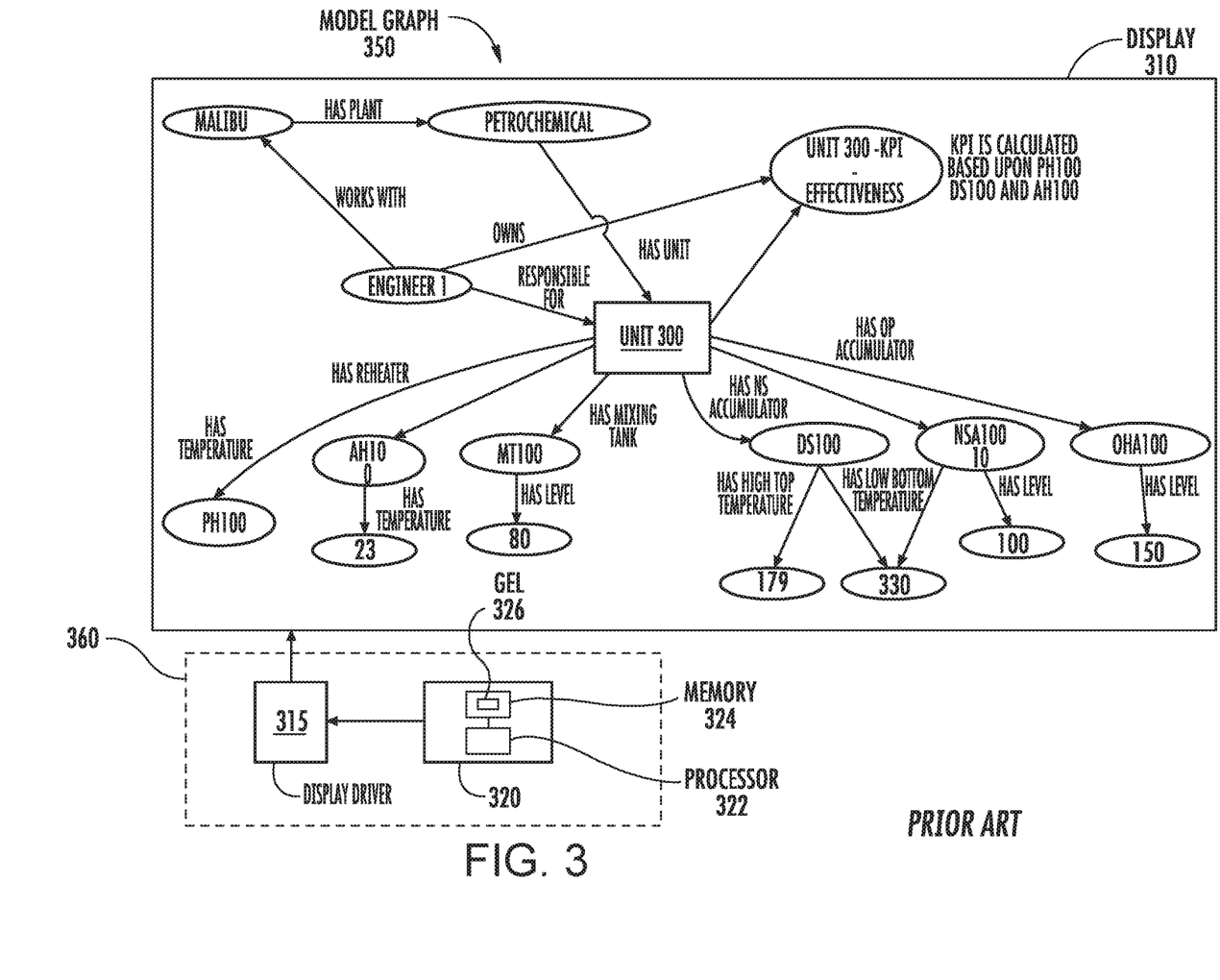
FIG. 3 shows an example application specific semantic model graph.

FIG. 3 shows an application specific model graph 350 showing an example hierarchical enterprise model on a display 310, provided herein only to demonstrate the complexity of a typical graphical model. Model graph 350 shows the relationship of a responsible individual shown as Engineer1 with an enterprise shown as Malibu Enterprise and the Unit shown as unit 300 being the anchor node in the model that he or she is responsible for. The Unit 300 has temperature and level measurements to determine the Unit's effectiveness. Unit 300 can be an asset, such as being the refinery shown in FIG. 2A. Visualizing such relationships in a known model tree is challenging and in the attempt the user will tend lose the context (The hierarchical enterprise model shown in FIG. 3 can be better visualized using a disclosed graphical explorer so that the user will not tend lose the context, such as in a form analogous to the semantic model graph 200 in FIG. 2A and semantic model graph 250 in FIG. 2B described above.

The display 310 is driven by a display drive system 360 that implements a GEL algorithm 326 comprising a display driver 315 which is controlled by a computer system 320 including a processor 322 (e.g., microcontroller, digital signal processor (DSP) or microcontroller unit (MCU)) and related memory 324 storing a disclosed GEL algorithm 326.

FIG. 4A, FIG. 4B, FIG. 4C, and FIG. 4D shows an example on-demand analysis 400 including a disclosed display delve system that implements a GEL algorithm 326 along with an example screen depiction 440, according to an example embodiment. Steps are numbered 401 to 406 in an example on-demand analysis performed by a plant manager as an example role only.

Figure 4A:
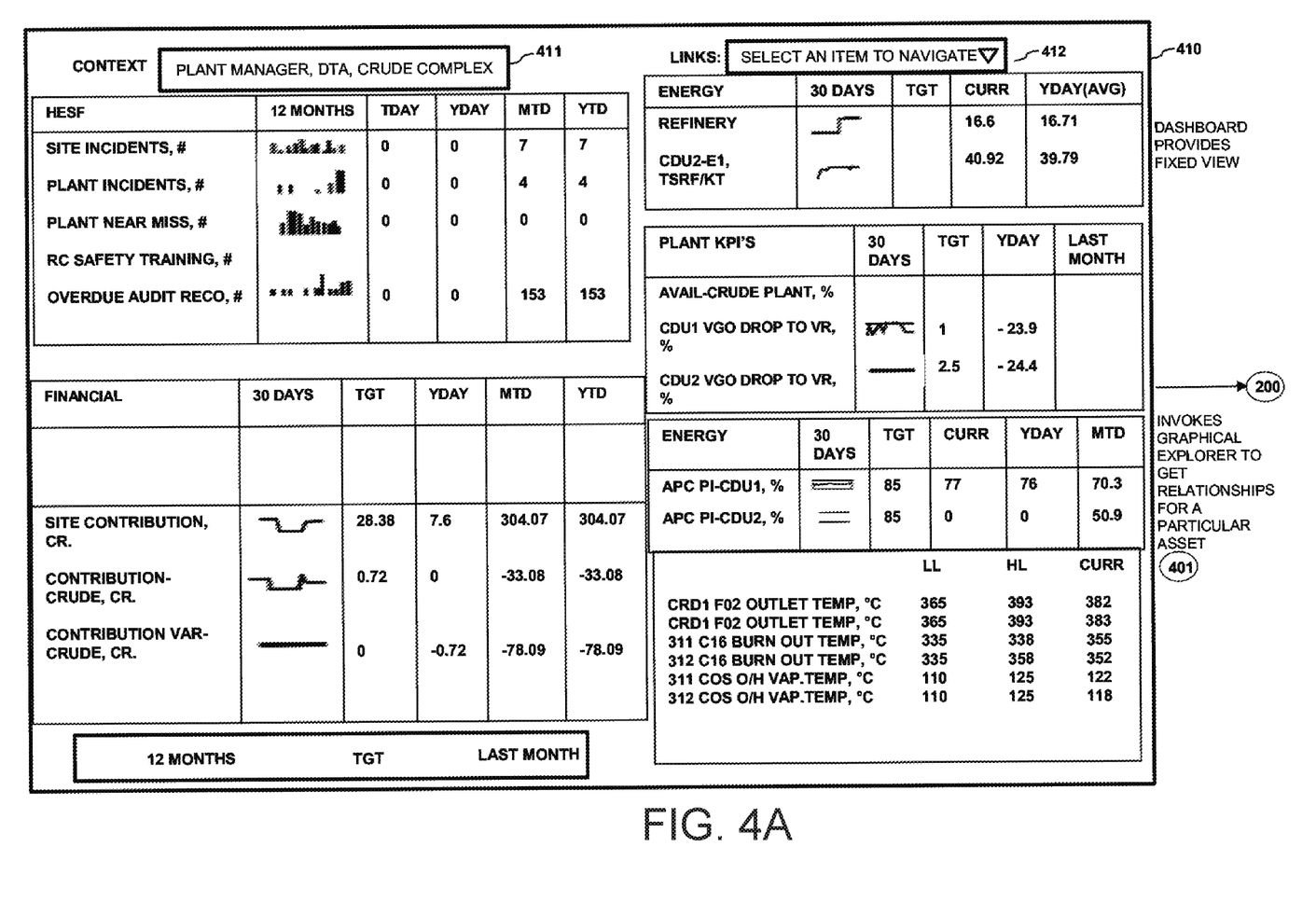
FIG. 4A to FIG. 4D shows an example on-demand analysis, according to an example embodiment.
Figure 4B:
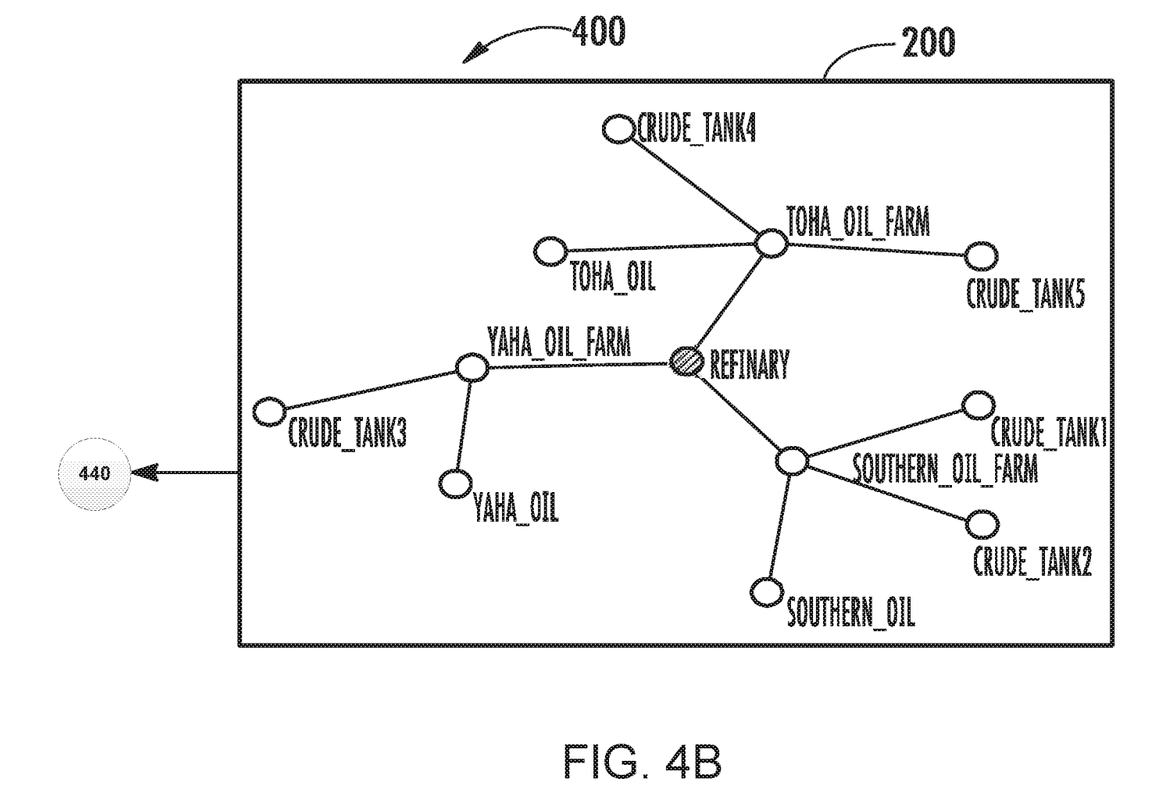
Figure 4C:
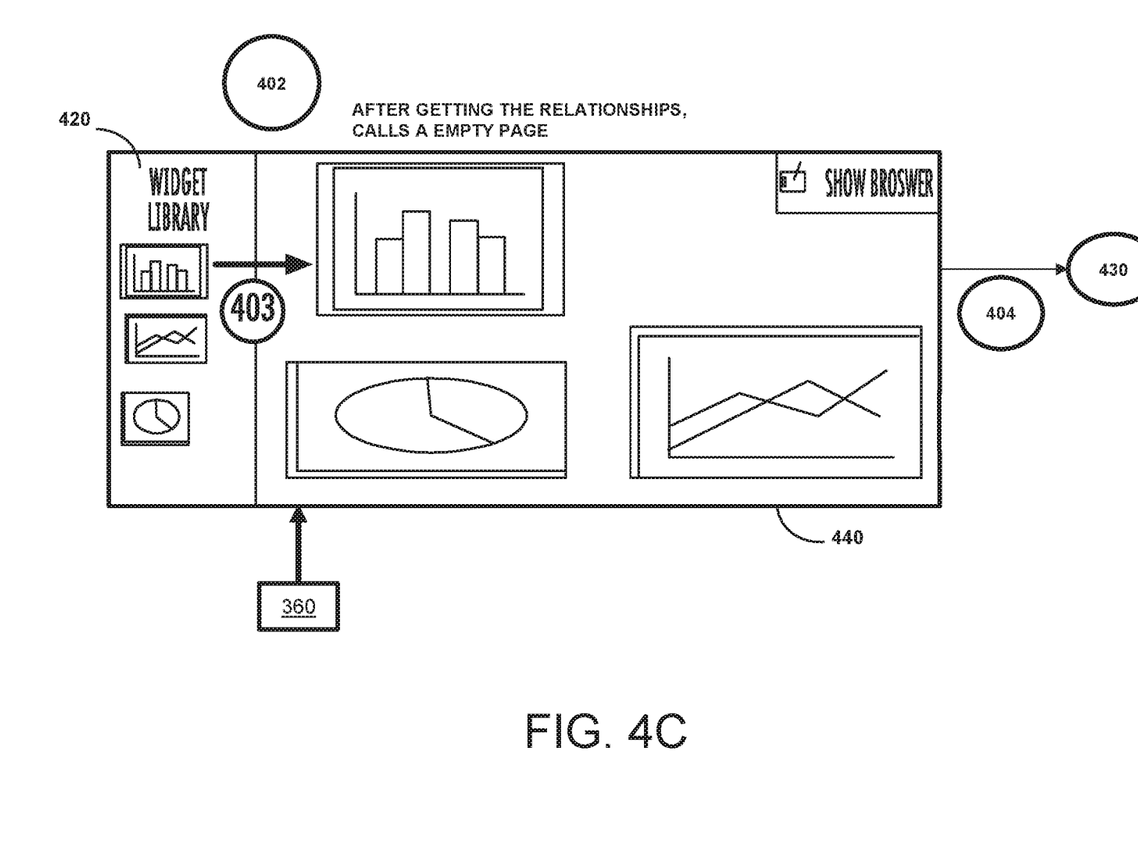
Figure 4D:
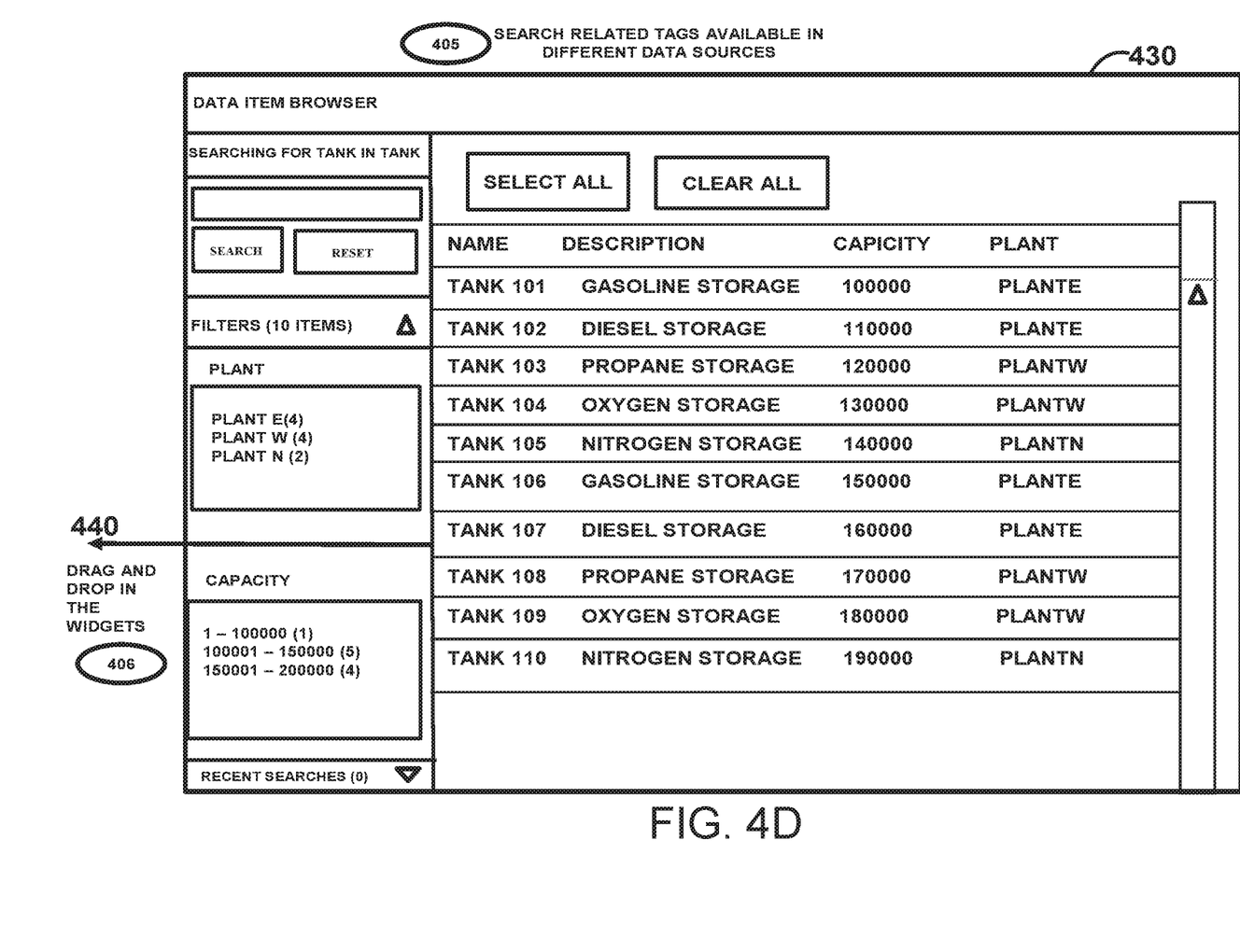

The plant manager reviews the dashboard view 410 shown and observes from the plurality of nodes in the process model that are shown (shown nodes) that the refinery node in the dashboard view 410 has a negative KPI (on productivity, and he or she clicks on the refinery. In response in step 401 the GEL algorithm invokes the graphical model explorer from the context menu 411 shown in the dashboard view 410. A links menu 412 is also provided in the dashboard view 410.

The GEL algorithm displays the refinery node as a first on-demand semantic model graph showing the refinery as the first selected node (anchor node) along with related nodes including the Southern_Oil_Farm farm at a first level with the links there between shown, shown as the example semantic model graph 200 with the refinery being the anchor node in FIG. 2A having levels of farms and tanks that is described above (the number of levels of depth being configurable). The user can then optionally further drill down by selecting one of the shown nodes (second selected node), and a second on-demand semantic graph can then be displayed with the second selected node as an anchor node along with related ones of the plurality of nodes with links there between shown, wherein the second on-demand semantic graph includes at least two levels (again with the number of levels of depth being configurable), such as FIG. 2B described above showing a second on-demand semantic model graph 250 with the anchor node now being the Southern_Oil_Farm.

After the plant manager understands the relationships (semantics) of the refinery node with the other nodes shown in the semantic model graph 200 in FIG. 2A and/or semantic model graph 250 in FIG. 2B, the plant manager in step 402 calls for an empty page, and in step 403 begins creating an on-demand analysis using the analysis widget library 420 shown. Example widgets in widget library 420 include tables, and chart controls relating to the anchor node (e.g., refinery) similar to EXCEL™ tools. In step 404 the data item browser 430 is selected to allow the node properties (including measured essentially real-time process parameters such as tank level, tank temperature, tank pressure) to be searched and used in the analysis widgets. In step 405 the plant manager searches the related tags available in different data sources provided in the data item browser 430 shown (such as Tank Level, Tank Temperature, tank pressure). In step 406 the plant manager drags and drops in the analysis widgets into the display 440 and uses the information shown in the display 440 to solve the negative KPI problem at hand.

As noted above, the model explorer layout can be based upon a Barnes-Hut algorithm, with changes on top of the algorithm to suit the needs of MES applications. The force layout is the enhancement which enforces the layout of the nodes presented in a user' preferred layout. This also handles multiple nodes of same type in a user understandable manner.

Briefly, the Barnes-Hut Algorithm implements a Barnes-Hut tree. In a two-dimensional n-body simulation, the Barnes-Hut algorithm recursively divides the n bodies into groups by storing them in a quad-tree. Each node in this tree represents a region of the two-dimensional space. The topmost node represents the whole space, and its four children represent the four quadrants of the space and each quadrant can again be divided into four quadrants. The space is recursively subdivided into quadrants until each subdivision contains 0 or 1 bodies (some regions do not have bodies in all of their quadrants). There are two types of nodes in the quad-tree: internal and external nodes. An external node has no children and is either empty or represents a single body. Each internal node represents the group of bodies beneath it, and stores the center of mass and the total mass of all its children bodies.

Disclosed methods can further include responsive to the user selecting a node, presenting the related information relating to the node in at least two levels. The process model can comprises a manufacturing model, enterprise model, ISA 95 model, or generally any information model.

The GEL algorithm can comprise a Barnes-Hut algorithm. The Barnes-Hut algorithm can further comprise clustering of similar ones of the plurality of nodes which can be triggered if a number of similar ones of the nodes is more than a configurable (predetermined) limit (e.g., ≥5). The nodes can be separated into clustered nodes and non-clustered nodes, where the Barnes-Hut algorithm can further comprise providing visually differentiated presentations for the clustered nodes and non-clustered nodes. Visually differentiating can be implemented by circle size and color for the nodes (e.g., configurable size and color, default is bigger, red filled circle indicates cluster node), fixed layout to reduce user human cognizant loading so that same layout is presented even after coming back from too deep navigation.

The Barnes-Hut algorithm further can comprises providing more related information, such as a particular node's cluster providing parent-child relationships to other nodes, related neighborhood nodes which may have impact to the node in focus, attributes of the node such as but not limited to KPI, roles assigned, asset documentation etc., regarding an individual ones of the nodes responsive to a request from the user. The Barnes-Hut algorithm further comprises fixing a position of selected asset types so that the user can understand the origin to the point of node under focus. A fixed layout can reduce user human cognizant loading so that same layout is presented even after coming back from too deep navigation. The position is persisted even after moving to different details and coming back to the same node to provide same graphical rendering of the layout.

Disclosed GEL algorithms can also provide context menu features in the nodes and navigate to other pages. A context menu such as context menu 411 shown in FIG. 4A is a menu item which can be invoked by clicking on a particular node and in response the GEL algorithm presents all the related information, such as but not limited to asset flow graphics, asset documentation links, trend, etc.

As described above disclosed graphical model explorers provide the user quick identification of the relationships for a particular asset/entity in the model. This provides enhanced understanding useful for problem solving particularly when additional information is presented along with neighborhood relationships.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, disclosed embodiments can be used beyond semantic models to more generally entity based models that has a deep hierarchy and multiple relationships. In addition, while a particular feature may have been disclosed with respect to only one of several implementations, such feature may be combined with one or more other features of the other implementations as may be desired and advantageous for any given or particular application.

The invention claimed is:

1. A method of on-demand model navigation in an industrial plant comprising:

providing a computer system including non-transitory machine readable storage storing a graphical explorer layout (GEL) algorithm run by said computer system including a processor and a display device for enabling a user exploring within an enterprise process model (enterprise model) including a plurality of assets as a plurality of nodes, relationships between said plurality of assets as links between said plurality of nodes, and related information regarding said plurality of nodes, wherein said plurality of assets as said plurality of nodes comprises at least one of refinery, farms and tanks in the industrial plant, and said GEL algorithm triggering said display device for:

displaying an initial dashboard fixed view including two or more of said plurality of nodes (shown nodes), a context menu and a menu for said links (links menu);

responsive to the user selecting a first of said shown nodes (first selected node) from said dashboard fixed view displaying a first on-demand enterprise model graph (first enterprise model graph) showing said first selected node as an anchor node along with related ones of said plurality of nodes with said links there between shown;

the user creating an on-demand analysis using an analysis widget library that is displayed which includes tables, and chart controls relating to said anchor node by the user selecting at least a first tag representing properties associated with the selected node from a listing of a plurality of tags provided in a data item browser that is then used in said analysis widget library;

wherein said properties of said tags each include at least one of tank level, tank temperature, and tank pressure; and dragging and dropping said properties of said first tag in said analysis widget library to provide a display view.

2. The method of claim 1, further comprising responsive to selecting a second of said shown nodes (second selected node) from said first enterprise model graph, said GEL algorithm triggering said display device for displaying a second on-demand enterprise model graph (second enterprise model graph) with said second selected node as an anchor node along with related ones of said plurality of nodes with said links there between shown, wherein said second enterprise model graph includes at least two levels.

3. The method of claim 1, wherein said enterprise process model comprises a manufacturing model.

4. The method of claim 1, wherein said GEL algorithm provides clustering of similar ones of said plurality of nodes before said displaying said first enterprise model graph if a number of said similar ones of said plurality of nodes is more than a configurable (predetermined) limit.

5. The method of claim 1, wherein said GEL algorithm divides said plurality of nodes into clustered nodes and non-clustered nodes, and wherein said GEL algorithm provides visually differentiated presentations for said clustered nodes and said non-clustered nodes in said first enterprise model graph.

6. The method of claim 1, wherein said GEL algorithm provides more of said related information regarding any of said shown nodes responsive to a request from the user.

7. The method of claim 1, wherein said GEL algorithm fixes a position of selected asset types so that the user can understand an origin to a point of a node under focus selected from said shown nodes.

8. The method of claim 1, wherein said enterprise model comprises a semantic model.

9. A software product for on-demand model navigation in an industrial plant, comprising:
    a non-transitory data storage medium that includes program instructions for a graphical explorer layout (GEL) algorithm for enabling a user exploring within an enterprise process model (enterprise model) including a plurality of assets as a plurality of nodes, relationships between said plurality of assets as links between said plurality of nodes, and related information regarding said plurality of nodes, wherein said plurality of assets as said plurality of nodes comprises at least one of refinery, farms and tanks in the industrial plant, and said GEL algorithm executable by a computer system including a processor to enable said processor to execute a method of on-demand model navigation, said program instructions comprising:
    code for displaying an initial dashboard fixed view including two or more of said plurality of nodes (shown nodes), a context menu and a menu for said links (links menu);
    code for responsive to the user selecting a first of said shown nodes (first selected node) from said dashboard fixed view displaying an on-demand enterprise model graph (first enterprise model graph) showing said first selected node as an anchor node along with related ones of said plurality of nodes with said links therebetween shown,
    code for creating an on-demand analysis using an analysis widget library that is displayed which includes tables, and chart controls relating to said anchor node by the user
    selecting at least a first tag representing properties associated with the selected node from a listing of a plurality of tags provided in a data item browser that is then used in said analysis widget library; wherein said properties of
    said tags each include at least one of tank level, tank temperature, and tank pressure; and
    code for dragging and dropping said properties of said first tag in said analysis widget library to provide a display view.

10. The software product of claim 9, further comprising code for responsive to selecting a second of said shown nodes (second selected node) from said first enterprise model graph, said GEL algorithm triggering a display device for displaying a second on-demand enterprise model graph (second enterprise model graph) with said second selected node as an anchor node along with related ones of said plurality of nodes with said links there between shown, wherein said second enterprise model graph includes at least two levels.

11. The software product of claim 9, wherein said enterprise model comprises a manufacturing model.

12. The software product of claim 9, wherein said GEL algorithm provides clustering of similar ones of said plurality of nodes before said displaying said first enterprise model graph if a number of said similar ones of said plurality of nodes is more than a configurable (predetermined) limit.

13. The software product of claim 9, further comprising code for dividing said plurality of nodes into clustered nodes and non-clustered nodes, and wherein said GEL algorithm provides visually differentiated presentations for said clustered nodes and said non-clustered nodes in said first enterprise model graph.

14. The software product of claim 9, wherein said GEL algorithm provides more of said related information regarding any of said shown nodes responsive to a request from the user.

15. The software product of claim 9, wherein said GEL algorithm fixes a position of selected asset types so that the user can understand an origin to a point of a node under focus selected from said shown nodes.

16. The software product of claim 9, wherein said enterprise model comprises a semantic model.

* * * * *